United States Patent
Peuchert et al.

(10) Patent No.: US 6,794,323 B2
(45) Date of Patent: Sep. 21, 2004

(54) BOROSILICATE GLASS WITH HIGH CHEMICAL RESISTANCE AND USE THEREOF

(75) Inventors: Ulrich Peuchert, Bodenheim (DE); Christian Kunert, Mainz (DE); Reiner Bartsch, Tischenreuth (DE)

(73) Assignee: Schott Glas, Mainz (DE)

( * ) Notice: Subject to any disclaimer, the term of this patent is extended or adjusted under 35 U.S.C. 154(b) by 70 days.

(21) Appl. No.: 10/088,618

(22) PCT Filed: Jul. 18, 2001

(86) PCT No.: PCT/EP01/08285

§ 371 (c)(1),
(2), (4) Date: Aug. 13, 2002

(87) PCT Pub. No.: WO02/08134

PCT Pub. Date: Jan. 31, 2002

(65) Prior Publication Data

US 2003/0087745 A1 May 8, 2003

(30) Foreign Application Priority Data

Jul. 22, 2000 (DE) .......................... 100 35 801

(51) Int. Cl.⁷ .............................................. C03C 3/091
(52) U.S. Cl. ........................................... 501/66; 501/67
(58) Field of Search ...................... 501/66, 67

(56) References Cited

U.S. PATENT DOCUMENTS

| | | | | | |
|---|---|---|---|---|---|
| 3,984,252 A | * | 10/1976 | Kiefer | .................. | 428/34.4 |
| 3,985,535 A | * | 10/1976 | Bennett et al. | ................ | 65/61 |
| 4,259,118 A | * | 3/1981 | Sack | ............. | 501/66 |
| 4,386,164 A | * | 5/1983 | Moser | .......... | 501/66 |
| 4,870,034 A | * | 9/1989 | Kiefer | ............ | 501/66 |
| 5,459,110 A | * | 10/1995 | Brix | ............. | 501/67 |
| 5,599,753 A | * | 2/1997 | Watzke et al. | ................ | 501/66 |
| 6,200,658 B1 | * | 3/2001 | Walther et al. | ............ | 428/34.4 |
| 6,537,626 B1 | * | 3/2003 | Spallek et al. | ............. | 428/34.4 |

FOREIGN PATENT DOCUMENTS

| | | |
|---|---|---|
| DE | 33 10 846 A | 9/1984 |
| DE | 37 22 130 A | 1/1989 |
| DE | 42 30 607 C1 | 1/1994 |
| DE | 44 30 710 C | 5/1996 |
| DE | 195 36 708 C1 | 10/1996 |
| DE | 297 02 816 U | 4/1997 |
| DE | 196 22 550 A1 | 12/1997 |
| DE | 198 01 861 A1 | 7/1999 |
| DE | 198 42 942 A1 | 4/2000 |
| JP | 03 218940 A | 9/1991 |
| JP | 04 074731 A | 3/1992 |
| JP | 08 333136 A | 12/1996 |

OTHER PUBLICATIONS

Derwent Abstract 1997–095318 of JP 08–333136.*
Machine Translation of JP 08–333136.*
Derwent Abstract 1992–129199 of JP 04–74731.*
Derwent Abstract 1991–328604 of JP 03–218940.*
Derwent Abstract 1997–228313 of DE 297 02 816.*

\* cited by examiner

*Primary Examiner*—Karl Group
*Assistant Examiner*—Elizabeth A. Bolden
(74) *Attorney, Agent, or Firm*—Michael J. Striker

(57) ABSTRACT

The borosilicate glass has a hydrolytic stability class of 1, an acid resistance class of 1 and a lye resistance class of at least 2 and a composition (in % by weight, based on oxide) of $SiO_2$ 70.5–76.5; $B_2O_3$ 6.5–<11.5; $Al_2O_3$ 4–8; $Li_2O$ 0.5–2; $Na_2O$ 4.5–9; $K_2O$ 0–5; with $Li_2O+Na_2O+K_2O$ 5.5–10.5; $MgO$ 0–1; $CaO$ 0–2; and $CeO_2$ 0–1, and optionally refining agents. This borosilicate glass is preferably free of $As_2O_3$, $Sb_2O_3$ and $BaO$ and is then especially advantageous as a pharmaceutical packaging material. It also may contain up to 3% by weight $TiO_2$ to block UV radiation. The borosilicate glass may include up to 0.5% by weight $ZrO_2$ to reach a lye resistance class of 1.

19 Claims, No Drawings

BOROSILICATE GLASS WITH HIGH CHEMICAL RESISTANCE AND USE THEREOF

The invention relates to a borosilicate glass of high chemicals resistance and to its uses.

Fused glass/metal seals which are used in a chemically corrosive environment, for example in the construction of chemical installations or reactors, require glasses which have a very high resistance to both acidic and basic media. Moreover, the thermal expansion of sealing glasses of this type has to be matched to the chemically highly resistant metals or alloys which are used. In this context, it is desirable for the coefficient of linear thermal expansion to be close to or slightly below that of the metal which is to be sealed, so that during cooling of the fused seal, compressive stresses are built up in the glass, these stresses first ensuring a hermetic seal and secondly preventing tensile stresses from building up in the glass, which would promote the occurrence of stress crack corrosion. When using Fe—Ni—Co alloys, e.g. Vacon® 11, with a coefficient of thermal expansion $\alpha_{20/300}$ of $5.4 \times 10^{-6}$/K, or zirconium ($\alpha_{20/300}$=$5.9 \times 10^{-6}$/K) or zirconium alloys, glasses with an expansion coefficient $\alpha_{20/300}$ of between >5 and $6.0 \times 10^{-6}$/K are required as sealing glasses for fused glass/metal seals.

A crucial parameter for characterizing the workability of a glass is the working point $V_A$ at which the viscosity of the glass is $10^4$ dpas. It should be low, since even slight reductions in $V_A$ lead to a considerable fall in production costs, since the melting temperatures can be reduced. Furthermore, a $V_A$ which is as low as possible is also advantageous in the production of the fused glass/metal seal, since it is then possible to avoid overheating the parts which are to be fused together, since fusion can occur either at a lower temperature or within a shorter time. Finally, when using glasses with a relatively low $V_A$ it is possible to prevent the seal being adversely affected and, in the most extreme circumstances, leaking as a result of evaporation and recondensation of glass components. Furthermore, the working interval of a glass, i.e. the temperature difference between the working temperature $V_A$ and the softening point $E_W$, the temperature at which the viscosity of the glass is $10^{7.6}$ dpas, is also of significance. The temperature range within which a glass can be worked is also known as the "length" of the glass.

Applications as primary packaging material for pharmaceuticals, such as ampoules or small bottles, also require glasses which have a very high chemical resistance with respect to acidic and basic media and, in particular, a very high hydrolytic stability. Furthermore, a low coefficient of thermal expansion is advantageous, since this ensures a good thermal stability.

Furthermore, the physical-chemical behavior of the glass during its further processing is of importance, since this has an influence on the properties of the end product and on its possible applications.

If a preform made from borosilicate glass which contains alkali metals, e.g. a tube, is processed further under hot conditions to form containers such as ampoules or small bottles, highly volatile alkali metal borates evaporate. The evaporation products condense in cooler regions, i.e. deposits are formed on the vessels, which have an adverse effect on their hydrolytic stability. Therefore, this phenomenon is disadvantageous in particular for applications of the glass in the pharmaceuticals sector, for example as primary packaging material for pharmaceuticals. The patent literature has already described glasses which have high chemicals resistances but are in need of improvement in particular with regard to their hydrolytic stability and/or have excessively high working points and/or do not have the desired expansion coefficients.

DE 42 30 607 C1 proposes chemically highly resistant borosilicate glasses which can be fused to tungsten. They have expansion coefficients $\alpha_{20/300}$ of at most $4.5 \times 10^{-6}$/K and, according to the examples, working points of $\geq 1210°$ C.

The borosilicate glasses described in the publication DE 37 22 130 A1 also have a low expansion of at most $5.0 \times 10^{-6}$/K.

The glasses described in patent DE 44 30 710 C1 have a relatively high $SiO_2$ content, namely >75% by weight and >83% by weight of $SiO_2+B_2O_3$ in combination with an $SiO_2/B_2O_3$ ratio of >8, and little $Al_2O_3$, a composition which does make them highly chemically resistant but leads to disadvantageously high working points. These glasses, which in some cases have levels of $ZrO_2$ (up to 3% by weight) and the $ZrO_2$-containing borosilicate glasses described in DD 301 821 A7 likewise have low thermal expansions of at most $5.3 \times 10^{-6}$/K and $5.2 \times 10^{-6}$/K and, in particular on account of their $ZrO_2$ contents, are highly resistant to lyes, but relatively susceptible to crystallization.

The glasses described in DE 198 42 942 A1 and DE 195 36 708 C1, have very high chemicals stabilities, being classified as belonging to hydrolytic, acid and lye class 1. However, the abovementioned drawbacks also apply to these glasses, on account of their high levels of $ZrO_2$.

Moreover, in the glasses of the prior art, the problem of the evaporation of alkali metals described above during the hot further processing of preshaped glass bodies will continue to occur.

This problem is neither referred to nor solved in DE 33 10 846 A1, which describes BaO-free laboratory glasses.

It is an object of the invention to find a glass which satisfies high demands both with regard to the chemicals resistance, i.e. belongs to lye class 2 or better, to hydrolytic class 1 and to acid class 1, and on workability and has little evaporation of alkali metals.

This object is achieved by borosilicate glass having a composition, in percent by weight based on oxide content of:

| | |
|---|---|
| $SiO_2$ | 70–77 |
| $B_2O_3$ | 6–<11.5 |
| $Al_2O_3$ | 4–8.5 |
| $Li_2O$ | 0.15–2 |
| $Na_2O$ | 4.5–9.5 |
| $K_2O$ | 0–5 |
| with $Li_2O + Na_2O + K_2O$ | 5–11 |
| MgO | 0–2 |
| CaO | 0–2.5 |
| with MgO + CaO | 0–3 |
| $ZrO_2$ | 0–<0.5 |
| $CeO_2$ | 0–1, | and optionally at least one standard refining agent in an amount sufficient for refining.

The glass according to the invention has an $SiO_2$ content of 70 to 77% by weight, preferably of 70.5 to 76.5% by weight of $SiO_2$. Higher levels would increase the working point excessively and reduce the coefficient of thermal expansion too far. If the $SiO_2$ content is reduced further, in particular the resistance to acids would deteriorate. An $SiO_2$ content of <75% by weight is particularly preferred.

The glass contains 6 to <11.5% by weight, preferably 6.5–<11.5% by weight, particularly preferably at most 11% by weight of $B_2O_3$. $B_2O_3$ reduces the working temperature and the melting temperature while, at the same time, improving the hydrolytic stability. This is because $B_2O_3$ bonds the alkali metal ions which are present in the glass more securely into the glass structure. While lower contents would not reduce the melting point sufficiently far and would lead to an increase in the susceptibility to crystallization, higher contents would have an adverse effect on the acids resistance.

The glass according to the invention contains between 4 and 8.5% by weight, preferably up to 8% by weight, of $Al_2O_3$. Like $B_2O_3$, this component bonds the alkali metal ions more securely into the glass structure and has a positive effect on the resistance to crystallization. At lower contents, the susceptibility to crystallization would rise accordingly and, in particular with high $B_2O_3$ contents, there would be an increased evaporation of alkali metals. Excessively high levels would make their presence felt in terms of an increase in the working-and melting points.

For the glasses according to the invention, it is essential for the levels of the individual alkali metal oxides to be within the following limits:

The glasses contain 4–9.5% by weight, preferably 4.5–9% by weight of $Na_2O$. They may contain up to 5% by weight of $K_2O$ and up to 2% by weight, preferably up to 1.5% by weight of $Li_2O$. The sum of the alkali metal oxides is between 5 and 11% by weight, preferably between 5.5 and 10.5% by weight, particularly preferably between 7.5 and <10.5% by weight. The alkali metal oxides reduce the working point of the glasses and are of crucial importance for setting the thermal expansion. Above the respective upper limits, the glasses would have excessively high coefficients of thermal expansion. Furthermore, excessively high levels of the components would have an adverse effect on the hydrolytic stability. Furthermore, for cost reasons, it is recommended to limit the use of $K_2O$ and $Li_2O$ to the maximum levels indicated. On the other hand, an insufficient level of alkali metal oxides would lead to glasses with a thermal expansion which is too low and would increase the working and melting points. With a view to making the glasses resistant to crystallization, it is preferable to use at least two types of alkali metal oxides. Even small amounts of $Li_2O$ and/or $K_2O$ in the range of a few tenths of % by weight allow diffusion of the components/assemblies involved in constructing the crystal phase toward the nucleus to be impeded and can therefore have a positive effect on the resistance to devitrification.

As further components, the glass may contain the divalent oxide MgO in an amount of 0–2% by weight, preferably 0–1% by weight, and CaO in an amount of 0–2.5% by weight, preferably 0–2% by weight, particularly 0–<2% weight. The sum of these two components is between 0 and 3% by weight, preferably between 0 and <3% by weight. The two components vary the "length of the glass", i.e. the temperature range within which the glass can be worked. The different strengths of network-modifying action of these components makes it possible, by exchanging these oxides for one another, to adapt the viscosity to the requirements of the particular production and working process. CaO and MgO reduce the working point and are securely bonded into the glass structure. Surprisingly, it has been found that limiting the levels of CaO to small amounts reduces the evaporation of highly volatile sodium and potassium borate compounds during hot-forming. This is of particular importance for $Al_2O_3$ contents, while at high $Al_2O_3$ contents it is possible to tolerate relatively high levels of CaO. CaO improves the resistance to acids. The latter statement also applies to the component ZnO, which may be present in the glass in an amount of up to 1% by weight. Furthermore, the glass may contain up to 1.5% by weight of SrO and up to 1.5% by weight of BaO, which increases the resistance to devitrification. The sum of these two components is between 0 and 2% by weight. The glass is preferably free of SrO and BaO. Particularly for use as primary packaging material for pharmaceuticals, it is advantageous if the glass is free of BaO.

Furthermore, the glass may contain coloring components, preferably $Fe_2O_3$, $Cr_2O_3$, CaO, in each case in amounts of up to 1% by weight, while the sum of these components should also not exceed 1% by weight. The glass may also contain up to 3% by weight of $TiO_2$. This component is preferably used when, for special applications of the glass, damage to a fused glass/metal seal by UV radiation or the release of UV radiation is to be prevented.

The glass may contain up to <0.5% by weight of $ZrO_2$, resulting in an improvement in the resistance to lyes. The $ZrO_2$ content is limited to this low maximum level, since higher levels would excessively increase the working point. Secondly, high levels of $ZrO_2$ increase the risk of flaws in the glass, since it is possible that particles of the relatively insoluble $ZrO_2$ raw material will remain unmelted and will pass into the product.

The glass may contain up to 1% by weight of $CeO_2$. At low concentrations, $CeO_2$ acts as a refining agent, and at higher concentrations it prevents the glass from being discolored by radiactive radiation. Therefore, seals produced using a $CeO_2$-containing glass of this type still allows visual checks for any damage, such as cracks or corrosion to the conductor wire, even after exposure to radioactive radiation. Even higher concentrations of $CeO_2$ make the glass more expensive and lead to an undesirable inherent brownish-yellow coloration. A $CeO_2$ content of between 0 and 0.3% by weight is preferred for applications in which the ability to avoid discoloration caused by radioactive radiation is not essential.

The glass may contain up to 0.5% by weight of $F^-$. This reduces the viscosity of the melt, which accelerates refining.

In addition to the components $CeO_2$ and fluorides, for example $CaF_2$, which have already been mentioned, the glass can be refined using standard refining agents, such as chlorides, for example NaCl, and/or sulfates, for example $Na_2SO_4$ or $BaSO_4$, which the finished glass contains in standard amounts, i.e. depending on the amount and type of refining agent used, in amounts of from 0.005 to 1% by weight. If $As_2O_3$, $Sb_2O_3$ and $BaSO_4$ are not used, the glasses are, apart from inevitable impurities, free of $As_2O_3$, $Sb_2O_3$ and BaO, which is advantageous in particular for use as primary packaging material for pharmaceuticals.

EXAMPLES

Twelve Examples of glasses according to the invention (A) and three comparative Examples (C) were melted from standard raw materials.

The glasses were produced in the following way: the raw materials were weighed out and thoroughly mixed. The glass mix was melted at approx. 1600° C. and then poured into steel molds.

Table 1 shows the respective composition (in % by weight, based on oxide), the coefficient of thermal expansion $\alpha_{20/300}$ [$10^{-6}$/K], the transformation temperature $T_g$ [° C.], the softening point $E_W$, the working point $V_A$ [° C.], which corresponds to the temperature at a viscosity of $10^4$ dpas, the temperature at the viscosity $10^3$ dPas L3 [° C.] and the difference L3–$V_A$ [K], the density [g/cm$^3$] and the hydrolytic stability, the acid resistance and the lye resistance of the glasses.

The chemical resistances were determined in the following ways:

- the hydrolytic stability H in accordance with DIN ISO 719. The table in each case indicates the base equivalent of the acid consumption as μg $Na_2O$/g of glass grit. The maximum value for a chemically highly resistant glass belonging to Hydrolytic Class 1 is 31 μg of $Na_2O$/g.
- the acid resistance S in accordance with DIN 12116. The table in each case indicates the weight loss in mg/$dm^2$. The maximum loss for an acid-resistant glass belonging to Acid Class 1 is 0.70 mg/$dm^2$.
- the lye resistance L in accordance with DIN ISO 695. The table in each case indicates the weight loss in μg/$dm^2$. The maximum loss for a glass belonging to Lye Class 1 (weakly soluble in lyes) is 75 mg/$dm^2$. The maximum loss for a glass belonging to Lye Class 2 (moderately soluble in lyes) is 175 mg/$dm^2$.

The requirements, namely Class 1 for H and S and at least 2 for L are satisfied in the glasses according to the invention. They are therefore highly chemically resistant. In particular with regard to hydrolytic stability, which is especially important for pharmaceutical applications, they produce excellent results, with values which are extremely low within H=1, namely base equivalents of ≦12 μg of $Na_2O$/g.

Their low working points $V_A$ of at most 1180° C. characterize their good and inexpensive workability.

The glasses according to the invention are eminently suitable for all applications in which chemically highly resistant glasses are required, for example for laboratory applications, for chemical installations, for example as tubes.

The glasses have a coefficient of thermal expansion $\alpha_{20/300}$ of between >5.0 and 6.0×$10^{-6}$/K, and in a preferred form of at least >5.2×$10^{-6}$/K, and in a particularly preferred form of between >5.3 and 5.9×$10^{-6}$/K, which can be varied in particular by means of the alkali metal content. Therefore, their linear expansion is well matched to that of Fe—Co—Ni alloys, e.g. Vacona® 11 ($\alpha_{20/300}$=5.4×$10^{-6}$/K), and to zirconium ($\alpha_{20/300}$=5.9×$10^{-6}$/K), and the glasses are suitable for fused glass/metal seals with these chemically highly resistant metals or alloys. In view of their own high chemicals resistance, they are therefore particularly suitable for fused glass/metal seals which are used in chemically corrosive environments, for example in the construction of chemical installations or reactors, or as pressure viewing glasses, glasses for viewing windows in steel pressure vessels in which chemically aggressive substances are also kept under pressure.

The glasses are suitable for sealing and soldering glasses and as sheathing glass for glass fibers.

TABLE 1

Compositions (in % by weight, based on oxide) and properties of glasses according to the invention (A) and comparative glasses (C)

| | A1 | A2 | A3 | A4 | A5 | A6 | A7 | A8 |
|---|---|---|---|---|---|---|---|---|
| $SiO_2$ | 74.1 | 74.6 | 74.0 | 75.6 | 76.1 | 73.0 | 73.0 | 76.1 |
| $B_2O_3$ | 10.6 | 10.7 | 10.6 | 8.3 | 8.4 | 10.4 | 9.0 | 7.0 |
| $Al_2O_3$ | 5.7 | 5.8 | 5.7 | 6.3 | 5.7 | 5.6 | 6.9 | 6.9 |
| $Li_2O$ | 0.2 | 1.0 | — | 0.15 | — | 0.2 | 0.7 | 1.0 |
| $Na_2O$ | 8.0 | 6.5 | 8.4 | 8.3 | 8.45 | 5.0 | 7.0 | 5.0 |
| $K_2O$ | — | — | — | — | — | 4.5 | 2.0 | 4.0 |
| MgO | — | — | — | — | — | — | 0.5 | — |
| CaO | 1.4 | 1.4 | 1.3 | 1.35 | 1.35 | 1.3 | 0.5 | — |
| $ZrO_2$ | — | — | — | — | — | — | 0.2 | — |
| $CeO_2$ | — | — | — | — | — | — | 0.2 | — |
| $\alpha_{20/300}$ [$10^{-6}$/k] | 5.31 | 5.05 | 5.35 | 5.39 | 5.33 | 5.55 | 5.84 | 5.68 |
| Tg [° C.] | 562 | 530 | 574 | 562 | 585 | 556 | 545 | 530 |
| Ew [° C.] | 787 | 767 | 805 | 783 | 807 | 811 | 753 | 774 |
| $V_A$ [° C.] | 1136 | 1129 | 1137 | 1167 | 1170 | 1146 | 1138 | 1175 |
| L3 [° C.] | n.d. | n.d. | 1349 | 1397 | n.d. | n.d. | n.d. | 1415 |
| L3-$V_A$ [k] | n.d. | n.d. | 212 | 230 | n.d. | n.d. | n.d. | 240 |
| ρ [g/$cm^3$] | 2.350 | 2.340 | 2.360 | 2.361 | 2.360 | 2.360 | 2.362 | 2.353 |
| H [μg $Na_2O$/g] | 10 | 12 | 9 | 7 | 7 | 10 | 12 | 9 |
| S [mg/$dm^2$] | 0.4 | 0.6 | 0.4 | 0.3 | 0.3 | 0.6 | 0.8 | 0.5 |
| L [mg/$dm^2$] | 102 | 102 | 104 | 90 | 85 | 107 | 83 | 86 |

| | A9 | A10 | A11 | A12 | C1 | C2 | C3 |
|---|---|---|---|---|---|---|---|
| $SiO_2$ | 71.0 | 71.0 | 76.1 | 71.0 | 72.8 | 73.3 | 71.9 |
| $B_2O_3$ | 11.0 | 11.0 | 10.4 | 11.0 | 11.5 | 11.5 | 8.9 |
| $Al_2O_3$ | 8.0 | 8.0 | 4.0 | 8.0 | 3.5 | 3.5 | 7.0 |
| $Li_2O$ | 0.5 | — | — | 1.0 | — | 1.0 | 1.3 |
| $Na_2O$ | 5.0 | 8.5 | 5.0 | 8.5 | 5.5 | 8.5 | 5.5 |
| $K_2O$ | 4.5 | — | 4.5 | — | 4.5 | — | 1.6 |
| MgO | — | — | — | — | — | — | — |
| CaO | — | 1.5 | — | 0.5 | 2.2 | 2.2 | 1.8 |
| $ZrO_2$ | — | — | — | — | — | — | 2.0 |
| $CeO_2$ | — | — | — | — | — | — | — |
| $\alpha_{20/300}$ [$10^{-6}$/k] | 5.68 | 5.42 | 5.34 | 5.90 | 5.73 | 5.97 | 5.42 |
| Tg [° C.] | 531 | 579 | 568 | 533 | 568 | 540 | 540 |
| Ew [° C.] | 758 | 754 | 793 | 715 | 769 | 791 | 765 |
| $V_A$ [° C.] | 1149 | 1169 | 1155 | 1071 | 1130 | 1125 | 1144 |
| L3 [° C.] | 1384 | 1390 | 1365 | 1284 | n.d. | n.d. | n.d. |
| L3-$V_A$ [k] | 235 | 231 | 210 | 213 | n.d. | n.d. | n.d. |
| ρ [g/$cm^3$] | 2.328 | 2.321 | 2.343 | 2.363 | 2.381 | 2.394 | 2.380 |
| H [μg $Na_2O$/g] | 11 | 8 | 8 | 12 | n.d. | n.d. | 10 |
| S [mg/$dm^2$] | n.d. | n.d. | 0.6 | n.d. | n.d. | 0.6 | 0.6 |
| L [mg/$dm^2$] | 135 | 133 | 105 | 118 | n.d. | n.d. | 62 | n.d. = not determined

The glasses according to the invention have low temperature differences between L3, the temperature at viscosity $10^3$ dPas, and $V_A$, the temperature at viscosity $10^4$ dPas, namely less than 250 K. This is advantageous for the further processing of hot-formed glass products, since the evaporation of alkali metals is reduced. This is because, as thermogravimetric tests have shown, it is dependent not only on the working point $V_A$ but also on the further viscosity profile toward lower viscosities.

FIG. 1 shows, for 2 example glasses according to the invention (A3 and A4), the result of a thermogravimetric test. The figure plots the mass loss [%] against log (viscosity [dPas]). When heated at a constant heating rate, the glass specimens, beyond approx. 1000° C., represent a low mass loss which, as demonstrated by mass spectrometry and X-ray analyses carried out on the condensation products from the melting process, is attributable to the evaporation of alkali metal borates. The figure illustrates that a low temperature difference L3-$V_A$ is desirable with a view to minimizing the evaporation of alkali metals.

The advantages of the present invention are made even clearer by quantitative characterization of the alkali metal evaporation by means of spectrometry methods. An optical detection method of this type has a higher measurement sensitivity while using a simpler test arrangement which is less susceptible to faults. Time-dependent spectrometer measurements were carried out on a number of example and comparative glasses. The spectrometer measurements are carried out on heated, rotating cylindrical specimens with a diameter of approx. 4 mm, using a multichannel spectrometer Zeiss MMS1. Having been excited by a supply of heat from a gas burner, the alkali metal ions which escape from the glass emit light of a specific wavelength, inter alia at approx. 589 nm (Na), 767 nm (K) and 670 nm (Li). The respective signals increase continuously as the test duration increases, approximately proportionally to the introduction of energy and also indicating a correspondingly reduced viscosity of the specimens.

Taking account of the molar levels of the alkali metal oxides $Na_2O$, $K_2O$ and $Li_2O$ in the glass, a qualitative dependency of the intensities I at the same test times is observed in the glasses throughout the entire period of the test, corresponding to $I(K)>I(Na)>(Li)$, i.e. potassium borates evaporate more easily than sodium borates, while lithium borates are relatively difficult to evaporate out of heated borosilicate glass.

Table 2 shows example spectrometer data for the glasses A8–A12 and C1–C2. For the compositions of these glasses, refer to Table 1. All the numerical values given in Table 2 represent means from 7 measurements carried out on different specimens from the same casting. The intensities of the examples A8, A9 and A11 are given in relation to the intensity values of C1. The intensities of A10 and A12 and C3 were related to C2. I (Li) of A8 and A9 is not given, since there is no reference value, as C1 is Li-free. I (Li) of A8 and A9 is, however, taken into account in I (total) of A8 and A9.

*I* (total) results from the formula *I* (total)=*I* (Na)+*I* (K)×0.65+ *I*(Li)×2.09.

This formula is used in the standard way to calculate characteristic data for the surface resistances of ampoules and small bottles in accordance with ISO 4802-2. In this case, the alkali metals are determined by flame photometry and the result is given as equivalent $Na_2O$ (ppm). The factors therefore correspond to the molar weight ratios $Na_2O/K_2O$ and $Na_2O/Li_2O$.

In detail, Table 2 shows:

| | |
|---|---|
| I (Na); time 3.5 s = | integral intensity of the sodium peak at test time 3.5 s ≅ 1200° C. |
| I (Na); time corresponding to $V_A$ = | integral intensity of the sodium peak at a test time at which the temperature of the specimen (pyrometric measurement) corresponds to $V_A$ |
| I (K); time 3.5 s = | integral intensity of the potassium peak at test time 3.5 s ≅ 1200° C. |
| I (K); time corresponding to $V_A$ = | integral intensity of the potassium peak at a test time at which the temperature of the specimen (pyrometric measurement) corresponds to $V_A$ |
| I (Li) 3.5 s = | integral intensity of the lithium peak at test time 3.5 s ≅ 1200° C. |
| I (Li); time corresponding to $V_A$ = | integral intensity of the lithium peak at a test time at which the temperature of the specimen (pyrometric measurement) corresponds to $V_A$ |
| I (total); time 3.5 s | calculated according to I (total) = I (Na) + I (K) × 0.65 + I (Li) × 2.09 |
| I (total); time corresponding to $V_A$ = | calculated according to I (total) = I (Na) + I (K) × 0.65 + I (Li) × 2.09 |

The data are relative intensities, in each case in relation to the intensity which is set at I=1.00.

Comparing the measurement data from Table 2 demonstrates that the glasses according to the invention have lower intensities than the corresponding comparative glasses. Since these measurements are carried out on reheated castings, this measurement method is eminently suitable for providing information about the evaporation of alkali metals, as occurs during hot further processing of preforms, e.g. the production of ampoules from glass tube.

The glasses according to the invention therefore have a reduced evaporation of alkali metals and are consequently eminently suitable for the production of primary packaging materials for pharmaceuticals, for example ampoules.

TABLE 2

Spectrometer data for Na (589 nm), potassium (767 nm) and Li (670 nm); relative intensities

| | A8 | A9 | A11 | C1 |
|---|---|---|---|---|
| I (Na); time 3.5 s | 0.87 | 0.80 | 0.87 | 1.00 |
| I (Na); time corresponding to $V_A$ | 0.94 | 0.84 | 0.93 | 1.00 |
| I (K); time 3.5 s | 0.78 | 0.76 | 0.89 | 1.00 |
| I (K); time corresponding to $V_A$ | 0.89 | 0.81 | 0.97 | 1.00 |
| I (Li) time 3.5 s | — | — | | |
| I (Li); time corresponding to $V_A$ | — | — | | |
| I (total) time 3.5 s | 0.87 | 0.81 | 0.88 | 1.00 |
| I (total) time corresponding to $V_A$ | 0.96 | 0.85 | 0.95 | 1.00 |

| | A10 | A11 | C2 | C3 |
|---|---|---|---|---|
| I (Na); time 3.5 s | 0.82 | 0.90 | 1.00 | |
| I (Na); time corresponding to $V_A$ | 0.96 | 0.92 | 1.00 | |
| I (K); time 3.5 s | — | 0.21 | — | |
| I (K); time corresponding to $V_A$ | — | 0.21 | — | |
| I (Li); time 3.5 s | — | 0.98 | 1.00 | |
| I (Li); time corresponding to $V_A$ | — | 1.18 | 1.00 | |
| I (total) time 3.5 s | 0.76 | 0.99 | 1.00 | 1.55 |
| I (total) time corresponding to $V_A$ | 0.91 | 0.97 | 1.00 | 1.74 |

What is claimed is:

1. A borosilicate glass of high chemicals resistance, characterized by a composition comprising, in percent by weight based on oxide content:

| | |
|---|---|
| $SiO_2$ | 70–77 |
| $B_2O_3$ | 6–<11.5 |
| $Al_2O_3$ | 4–8.5 |
| $Li_2O$ | 0.15–2 |
| $Na_2O$ | 4.5–9.5 |
| $K_2O$ | 0–5 |
| with $Li_2O + Na_2O + K_2O$ | 5–11 |
| MgO | 0–2 |
| CaO | 0–2.5 |
| with MgO + CaO | 0–3 |
| $ZrO_2$ | 0–<0.5 |
| $CeO_2$ | 0–1, | and optionally at least one standard refining agent in an amount sufficient for refining.

2. The borosilicate glass as defined in claim 1, free of both SrO and BaO and further comprising from 0 to 1 percent by weight of ZnO.

3. The borosilicate glass as defined in claim 1, further comprising from 0 to 1.5 percent by weight of SrO and from 0 to 1.5 percent by weight of BaO, with the proviso that a sum total amount of said SrO and said BaO present is not more than 2 percent by weight.

4. The borosilicate glass as defined in claim 1, further comprising at least one of $Fe_2O_3$, $Cr_2O_3$ and CoO, each in an amount of up to 1 percent by weight, with the proviso that a sum total amount of said $Fe_2O_3$, said $Cr_2O_3$ and said CoO does not exceed one percent by weight.

5. The borosilicate glass as defined in claim 1, further comprising $TiO_2$ in an amount of up to 3 percent by weight.

6. The borosilicate glass as defined in claim 1, free of $As_2O_3$ and $Sb_2O_3$ apart from inevitable impurities.

7. The borosilicate glass as defined in claim 1, having a coefficient of thermal expansion ($\alpha_{20/300}$) equal to $5.05 \times 10^{-6}$/K to $6.0 \times 10^{-6}$/K and a working point ($V_A$) of at most 1180° C., an acid resistance class (S) of 1, a Lye resistance class (L) of at least 2 and a hydrolytic stability (H) of 1.

8. A borosilicate glass at high chemicals resistance, characterized by a composition comprising, in percent by weight based on oxide content:

| | |
|---|---|
| $SiO_2$ | 70.5–76.5 |
| $B_2O_3$ | 6.5–<11.5 |
| $Al_2O_3$ | 4–8 |
| $Li_2O$ | 0.7–1.5 |
| $Na_2O$ | 4.5–9 |
| $K_2O$ | 0–5 |
| with $Li_2O + Na_2O + K_2O$ | 5.5–10.5 |
| MgO | 0–1 |
| CaO | 0–2 |
| with MgO + CaO | 0–3 |
| $ZrO_2$ | 0–<0.5 |
| $CeO_2$ | 0–1, | and optionally at least one standard refining agent in an amount sufficient for refining.

9. The borosilicate glass as defined in claim 8, free of both SrO and BaO and further comprising from 0 to 1 percent by weight of ZnO.

10. The borosilicate glass as defined in claim 8, further comprising from 0 to 1.5 percent by weight of SrO and from 0 to 1.5 percent by weight of BaO, with the proviso that a sum total amount of said SrO and said BaO present is not more than 2 percent by weight.

11. The borosilicate glass as defined in claim 8, further comprising at least one of $Fe_2O_3$, $Cr_2O_3$ and CoO, each in an amount of up to 1 percent by weight, with the proviso that a sum total amount of said $Fe_2O_3$, said $Cr_2O_3$ and said CoO does not exceed one percent by weight.

12. The borosilicate glass as defined in claim 8, further comprising $TiO_2$ in an amount of up to 3 percent by weight.

13. The borosilicate glass as defined in claim 8, free of $As_2O_3$ and $Sb_2O_3$ apart from inevitable impurities.

14. The borosilicate glass as defined in claim 8, having a coefficient of thermal expansion ($\alpha_{20/300}$) equal to $5.05 \times 10^{-6}$/K to $6.0 \times 10^{-6}$/K and a working point ($V_A$) of at most 1180° C., an acid resistance class (S) of 1, a Lye resistance class (L) of at least 2 and a hydrolytic stability (H) of 1.

15. An instrument glass for laboratory applications and for chemical installations, said instrument glass consisting of the borosilicate glass claimed in one of claims 1 to 14.

16. A sealing glass for a Fe—Co—Ni alloy, said sealing glass consisting of the boroslilcate glass claimed in one of claims 1 to 14.

17. A packaging material for pharmaceuticals, said packaging material consisting of the borosilicate glass claimed in one of claims 1 to 14.

18. An ampoule glass for pharmaceuticals, said ampoule glass consisting of the borosilicate glass claimed in one of claims 1 to 14.

19. A packaging material for pharmaceuticals, said packaging material consisting of a borosilicate glass having a coefficient of thermal expansion ($\alpha_{20/300}$) equal to $5 \times 10^{-6}$/K to $6.0 \times 10^{-6}$/K and a working point ($V_A$) of at most 1180° C., an acid resistance class (S) of 1, a Lye resistance class (L) of at least 2 and a hydrolytic stability (H) of 1 and characterized by a composition comprising, in percent by weight based on oxide content:

| | |
|---|---|
| $SiO_2$ | 70.5–76.5 |
| $B_2O_3$ | 6.5–<11.5 |
| $Al_2O_3$ | 4–8 |
| $Li_2O$ | 0.7–1.5 |
| $Na_2O$ | 4.5–9 |
| $K_2O$ | 0–5 |
| with $Li_2O + Na_2O + K_2O$ | 5.5–10.5 |
| MgO | 0–1 |
| CaO | 0–2 |
| with MgO + CaO | 0–3 |
| $ZrO_2$ | 0–<0.5 |
| $CeO_2$ | 0–1, | and optionally at least one standard refining agent in an amount sufficient for refining, but with the proviso that the boroslilcate glass is free of free of $As_2O_3$ and $Sb_2O_3$ apart from inevitable impurities and free of BaO.

* * * * *